United States Patent

[11] 3,596,053

[72] Inventors Isamu Kameda;
  Yoshimitsu Uto, both of Hiroshima, Japan
[21] Appl. No. 845,273
[22] Filed July 28, 1969
[45] Patented July 27, 1971
[73] Assignee Mitsubishi Jukogyo Kabushiki Kaisha
  Tokyo, Japan
  Continuation-in-part of application Ser. No. 464,816, June 17, 1965, now Patent No. 3,476,989, which is a continuation-in-part of application Ser. No. 211,835, July 23, 1962.

[54] CONSUMABLE WELDING ROD FOR WELDING CHROMIUM STEELS AND THE RESULTANT WELDS
14 Claims, 4 Drawing Figs.

[52] U.S. Cl. .................................................. 219/146
[51] Int. Cl. .................................................. B23k 35/22
[50] Field of Search ...................................... 219/146; 117/205, 206, 207; 148/24, 26

[56] References Cited
FOREIGN PATENTS
1,368,921 6/1964 France ..................... 117/205

Primary Examiner—J. V. Truhe
Assistant Examiner—Lawrence A. Rouse
Attorneys—Robert E. Burns and Emmanuel J. Lobato ABSTRACT: The consumable welding rods contain titanium and niobium in amounts such that a weld formed by melting the rod contains titanium niobium in an amount corresponding to the expression $2Ti+Nb=(6-14)C$ wherein Ti, Nb and C are the proportion of titanium, niobium and carbon in said weld metal. The proportion of titanium and niobium in the welding rod is determined by estimating the total quantity of carbon in the weld metal, the quantities of carbon, titanium and niobium lost by oxidation during welding and the variations in the quantities of titanium and niobium in the weld metal resulting from the welding process.

PATENTED JUL 27 1971 3,596,053

CONSUMABLE WELDING ROD FOR WELDING CHROMIUM STEELS AND THE RESULTANT WELDS

This application is a continuation-in-part of our copending U.S. application Ser. No. 464,816, filed June 17, 1965 and now U.S. Pat. No. 3,476,909 which in turn is a continuation-in-part of Ser. No. 211,835, filed July 23, 1962.

BACKGROUND OF THE INVENTION

This invention relates to consumable welding rods, particularly for use in welding members of chromium steels containing from 1 to 25 percent by weight of chromium and also to the welds resulting therefrom.

The present welding rods are intended particularly for use with "chromium steels" which term, as used herein involves not only chromium steels belonging to the ordinary category in a narrow sense but also general chromium steels, containing from 1 to 25 percent by weight of chromium, such as various high tensile structural steels and heatproof steels which are usually called chromium-molybdenum steels, nickel-chromium steels, and chromium-nickel-molybdenum steels, various special steels for example, aluminum-chromium-molybdenum steels, chromium-vanadium steels etc. used for particular purposes and the like. It is to be noted that the nickel-chromium referred to do not involve stainless nickel-chromium steels of austenitic structure which are not hardened upon welding.

In welding the aforesaid steels containing chromium, consumable welding rods containing alloying ingredients selected from the same group as those in the parent members to be welded are commonly employed. However, the use of such welding rods causes the carbon contained in the rods to be bound to the iron or chromium contained in the parent member whereby cementite, martensite, and chromium carbide are formed in the resulting weld metal, so that the weld becomes very hard and brittle. Therefore, the resulting weld metal has a tendency to include cracks which are formed during the cooling operation.

To prevent quenching cracks from occurring in the weld metal during cooling when conventional welding rods, as just described are employed, it is necessary to effect a preheating treatment prior to the welding operation and also to post heat the weld metals to soften them. This procedure increases the number of working steps and complicates the process. Consequently, the use of conventional consumable welding rods has disadvantages including high expense and low efficiency.

In manufacturing apparatuses used in chemical industries and especially petroleum refiners, clad steel sheets comprising low chromium steels are often used as base materials and stainless 13 percent chromium steels as cladding materials. In welding such clad steel sheets, it is common practice to weld first the side of the base material and then to weld the side of the cladding material. Under these circumstances, during welding of the first layer portion on the cladding side, a portion of the weld metal being formed thereon penetrates the adjacent part of the weld metal which has been previously formed on the base side, resulting in a decrease in the high temperature creep limit or strength of the weld metal formed on the cladding side. It is highly desirable to avoid this disadvantage.

SUMMARY OF THE INVENTION

An object of the present invention is the provision of an improved consumable welding rod whereby highly desirable welds of chromium steel other than nickel-chromium steels of austenitic structure may be obtained.

Another object of the invention is to provide an improved consumable welding rod of chromium steel type with a flux which results in a chromium-containing weld metal having such desirable mechanical and physical properties that the post heating treatment usually required in order to prevent the occurrence of cracks during cooling operation can be eliminated.

A further object of this invention is the provision of weldments and welds of chromium steel other than chromium steel of austenitic structure which have highly advantageous mechanical and chemical properties and which do not suffer from the above noted disadvantages.

It has been found that highly advantageous welds may be formed by welding members of chromium steels other than nickel-chromium steels of austenitic structure with a consumable welding rod or wire which includes titanium and niobium in such proportion that the resulting weld metal includes carbon and a combination of titanium and niobium in an amount which corresponds to the expression $$2Ti + Nb = C \times c$$

wherein Nb represents the percent content of niobium in said weld metal, Ti the percent content of titanium in said weld metal, and C represents the percent content of carbon in said weld metal and wherein $c$ denotes a numerical value ranging from 6 to 14. The welding rod and wire may also include a flux which can contain a portion or all of either the niobium or titanium. Thus, according to the present invention, a weld is produced by use of the present welding rod and when present, flux which contains titanium and niobium in such proportion that twice the content of titanium plus the content of niobium equals the content of carbon multiplied by a numerical factor ranging from 6 to 14.

DESCRIPTION OF THE PREFERRED EMBODIMENTS

Figure 1:
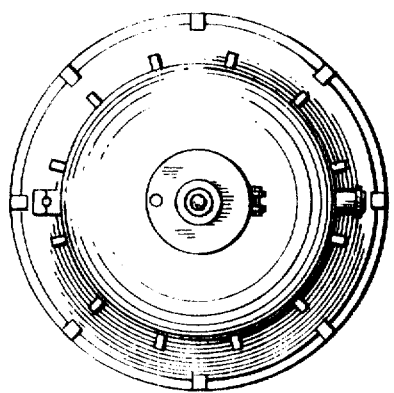
FIG. 1 is a plan view and FIG. 2 is a vertical section of vertical reactor which has been welding with a consumable welding rods of the present invention.

The term "welding rod" used in the specification and appended claims includes, in addition to welding electrodes of rod shape, core wire, core flux electrode, wire used for automatic welding and continuous automatic welding such as coiled continuous wire, and the like. The welding rod may also be a composite rod; for example, titanium or a mixture of titanium and niobium with or without other metals can be included as a powder in the interior of the rod. Also, the term "flux" used herein is interpreted as involving flux and coating agent. The weld metal includes, in addition to the metal portion deposited on the parent metal from the filler metal, all metal portions of the base or parent metal which are melted during welding so as to be part of the resulting weld.

It is known that in order to prevent the occurrence of blow holes in weld metals, to provide sound products and to effect the growth of very fine crystals in the weld metals which increases their strength, a small amount of titanium as well as aluminum, zirconium, vanadium, tantalum, magnesium and/or manganese may be added to a welding rod, because such elements have a high affinity for oxygen and nitrogen. Such a welding rod is normally used in air. However, as titanium has a far higher affinity for oxygen that for carbon, the same is converted into oxides but forms no compounds with carbon after welding. An important aspect of the present invention is that in a gas shield atmosphere, titanium and niobium are used in conjunction with carbon in an amount as above specified for the purpose of preventing the formation of carbides in the resulting weld metal.

The simultaneous use of niobium and titanium has a multiple effect in improving the structure and toughness of the weld metal. While the present invention is not to be limited in any way by theoretical considerations, it is believed that both elements are partly converted to oxides and nitrides, providing nuclei whereby a fine structure is obtained and the toughness is thereby improved. In the consumable welding rod of the present invention for use in welding chromium steels, niobium and titanium are advantageously included in such proportion that twice the content of titanium plus the content of niobium ranges from 0.26 to 5.0 percent by weight. Preferably titanium is present in an amount of about 0.07 to 1.3 percent by weight and niobium in an amount of about 0.15 to 5 percent by weight.

In a particularly preferred embodiment of the present invention, the welding rod also includes from 0.3 to 5.5 percent of molybdenum based upon the weight of the rod. Thus, according to a further aspect of the invention, the rod includes 0.07 to 1.3 percent titanium, 0.15 to 5.0 percent of niobium, and 0.3 to 5.5 percent of molybdenum based upon the weight of the rod, the latter combination being particularly preferred. According to the present invention, depending on the welding method employed, the present welding rods may be used either with or without a flux. Further, both niobium and titanium may be included totally or in part in welding rods and/or fluxes according to this invention.

Both niobium and titanium have an affinity or a binding power for carbon higher than that of chromium and iron and hence titanium and niobium, each suppress the hardening and embrittling of weld metals which results from the formation of cementite, martensite, chromium carbide etc. due to binding of chromium and iron with carbon in the weld metal.

The amount of titanium and niobium in the weld metal therefore depends upon the content of carbon in the same. It has been found that, when both niobium and titanium are included in the resulting weld metal, the harmful carbides and the like, formed by the binding of carbon with chromium and iron in the weld metal are effectively eliminated in the presence of niobium and titanium in amounts satisfying the previous expression $$2Ti+Nb=C\times(6\sim14)$$

This expression results from the fact that titanium has a binding power for carbon approximately twice that of niobium.

The reasons for the specification of the lower and upper limits of niobium and titanium as above described include the fact that if niobium and titanium are present in an amount below the carbon content of 3 times or 6 times respectively, the resulting weld metal is objectionable in that it is hardened and embrittled due to the increased formation of harmful carbides. On the other hand, if the content of niobium and titanium exceeds this value, oxides are produced in the weld metal resulting in decreased purity of the weld. Further, the use of greater amounts of niobium and titanium is not economical.

In practicing the invention, niobium and/or titanium may be included directly in a welding rod alone or in a flux alone. Alternatively, both welding rod and flux may include niobium and/or titanium in any suitable porportions. The greater part of niobium included in the welding rod will migrate into the resulting weld metal even during air welding without a large loss thereof and affects the weld metal in the desired manner as above described. However, much titanium may be lost during welding because of its oxidation. Therefore, the present welding rod including titanium is preferably used in an atmosphere of any suitable inert gas.

If it is desired to include titanium or titanium and niobium in a flux rather than in a welding rod, then it is preferable to include the same in the flux in excess of the amount desired to migrate to the resulting weld metal since, inevitably, niobium and titanium partially remain in the resulting slag. It is to be understood that, niobium which is rather expensive may be included preferably in a welding rod in order to increase the proportion thereof migrating to the weld metal.

The inclusion of titanium or niobium in the welding rod also serves to reduce the hardness of the welding rod and to improve is brittleness whereby the rod can easily be prepared by a drawing operation. Thus, the addition of titanium or niobium to a welding rod results in dual benefits; migration into the resulting deposit metals is assured and the operation of drawing the rods is facilitated.

As pointed out above, the greater proportion of titanium and niobium included in a welding rod will migrate into the resulting weld metal during welding. However, in most cases, titanium and niobium are partially lost due to oxidation and hence the total amount thereof does not always migrate into the weld metal. In addition, a portion of the material of the base member to be welded will penetrate into the weld metal resulting in an increase of carbon content in the weld. Therefore, the amount of titanium and niobium to be added to a welding rod must be determined in consideration of the phenomena just described. In general, loss of niobium and titanium due to oxidation and the like depends upon various factors such as a state under which the same has been added to the rod, welding process, whether a flux is used and the type of flux, welding atmosphere and the like. Titanium and niobium can be included in a welding rod or in flux in the form of either element metal or alloy. Titanium and niobium included in a welding rod and/or flux can be estimated to be decreased in amount by approximately at most 30 percent of the added weight during a welding operation.

The amount of base material which has penetrated into the weld metal may vary considerably in accordance with the type of base material, magnitude of welding current, polarity of current applied to a workpiece, whether direct current or alternating current is used, and other welding conditions. In the ordinary cases however, the amount of the mother material penetrated into the weld metal can be reasonably considered to be less than approximately 30 percent of the total weight of the weld metal. The remaining portion of the deposit metal in this case approximately 70 percent thereof will originate from the welding rod. The invention will now be described in terms of welding rods especially suitable for use in welding of chromium steels containing carbon in amount ranging from 0.03 to 0.30 percent.

It is assumed that as a welding rod a chromium steel is used including a composition comprising 0.02 to 0.12 percent C, up to 1 percent Si, up to 1 percent Mn, up to 0.03 percent P, up to 0.03 percent S, etc. In order to determine the amount of niobium and titanium to be included in a welding rod and/or in a flux made of the aforesaid chromium steel, the content of carbon in the resulting weld metal is first calculated. The carbon included in the weld metal originates from carbon migrating from the welding rod into the weld metal and carbon penetrated from the base or material being welded. Assuming that the weld metal is composed of 70 percent of the welding rod and 30 percent of the base material, as previously explained, an amount of carbon migrating from the rod into the weld metal is calculated as $$(0.02\sim0.12\%)\times0.7=0.014\sim0.084\% \quad (3)$$

The amount of carbon migrating from the base material into the weld metal is calculated as $$(0.03\sim0.30\%)\times0.03=0.009\sim0.09\% \quad (4)$$

By adding the equations (3) and (4), the total content of carbon is given $$0.023\sim0.17\% \quad (5)$$

According to the invention, titanium and niobium are required to be added to the welding rod in an amount equal to 6 times to 14 times that content of carbon, Therefore, the amount of the titanium and niobium is calculated as $$(0.023\sim0.17\%)\times(6-14)=0.139\sim2.38 \quad (6)$$

Assuming that the oxidation loss is 30 percent, the amount of titanium and niobium is increased to $$(0.138\sim2.38\%)\div0.7=0.197\sim3.4\% \quad (7)$$

In this case it is to be understood that welding is effected in an atmosphere of any suitable inert gas. Finally, by taking into account, the particular flux or the particular welding process used (e.g. increase in the amount of carbon in the weld metal resulting from the use of carbon dioxide welding process) the final amount of niobium and titanium to be included in the welding rod and/or the flux is calculated as $$(0.197 \sim 3.4\%) \div 0.7 = 0.28 \sim 4.86 \quad (8)$$

on the basis of the weight of the welding rod. Within the accuracy of these calculations the final amount of niobium and titanium to be included in the welding rod is about 0.25 to 5 percent. In order to determine with greater precision the amount of titanium and niobium to be included in either or both of the filler metal and flux according to the invention, the following more rigorous method can be used. The carbon content of the weld metal can be expressed by the equation:

$$C = W[C_1 \times C_2(1-x)] \quad (9)$$

where $W$ = weight of weld metal, $C_1$ = average percent content of carbon in the fused portion of base metal, $C_2$ = average percent content of carbon in weld metal.

$x$ = the proportion of the weld metal originating from the base metal.

The weight of the weld metal can be calculated from the dimension of a groove and amount of reinforcement, or from a sectional area perpendicular to the welding axis of the weld, a weld length and the specific gravity of the weld metal, and generally is predetermined upon the design of welding.

The amount of carbon $WC_1x$ contained in the fused portion of the metal can be estimated from the composition of the parent metal and the above mentioned welding requirements in the following manner. The proportion $C_1$ of carbon contained in the particular parent metal may be obtained from the chemical composition thereof, furnished by a manufacturer of that metal. From the welding requirements, the total weight $Wb$, of that portion of the base metal molten by welding heat can be estimated. In addition, the amount of carbon and the amount of titanium and niobium lost by oxidation from the parent metal during welding can be estimated from various welding requirements. If $\eta_{c_1}$ designates a ratio between the carbon content $C_1Wx$ in the fused portion of the base metal, and the total carbon content in that portion of the base metal molten by welding heat (which is called a "yield rate of carbon" in the fused portion of the base metal). Then, the following equation can be $$WC_1x = W_b\eta_{c_1}C_1' \quad (10)$$

The carbon content $WC_2(1-x)$ in the weld metal can be calculated as follows: Under the assumed conditions for welding, a weight of a filler metal $W_c$ can be estimated except for the portion thereof remaining unused. Upon design, a rate of weight $W(1-x)$ of weld metal to lost weight $W_c$, or deposition rate $\eta W$ is first estimated from the assumed welding requirement and then the weight to be lost is determined. On the basis of this determination the necessary amounts of welding materials are prepared.

Assuming that $C'_{2w}$ designates a proportion of carbon contained in the filler metal and that $\eta_{cw}$ designates a deposition rate of carbon contained in the filler metal, then the carbon content C in the weld metal [see the equation (10)], is expressed by the equation $$C = W[C_1 \times C_2(1-x)] = W_b\eta_{c_1}C_1' + W_{cc w}C_{2w}' \quad (11)$$

With respect to the carbon content in the weld metal thus determined, the amount of titanium and niobium included should be calculated to hold equation (1) over the entire region of the weld metal. To this end, titanium and niobium must be added to either or both of the filler metal and the flux in the respective amounts equal to the calculated amounts plus certain additions. Thus, the following equation is obtained.

$$Nb' + 2Ti' = \frac{(6 \sim 14)(W_b \cdot \eta_{c_1}C_1' + W_c \cdot \eta_{cw}C_{2w}')}{\eta_a} \quad (12)$$

As previously explained, $C'_1$ and $C'_{2w}$ have been predetermined from the conditions under which the materials to be welded are used or from the welding requirements. $W_b$ and $W_c$ are usually calculated from W and the welding requirements. Also $\eta_{c_1}, \eta_{cw}$ and $\eta_a$ can be estimated by experiments.

In Table 1 are listed magnitudes of Vickers hardness of various deposit metals, containing chromium in different amounts, formed by the conventional welding rods and various weld metals of the present welding rods having the same composition as that indicated for the conventional rods but including in addition titanium and niobium.

TABLE 1.—COMPOSITION AND HARDNESS OF WELD METAL

| Approx. percentage of chromium | Composition in percent | | | Vickers hardness of conventional weld metal | Vickers hardness of present weld metal |
|---|---|---|---|---|---|
| | C | Cr | Mo | | |
| 3% Cr | .12 | 3.94 | | 363 | 151–183 |
| 5% Cr | .19 | 5.03 | 1.67 | 335 | 158–194 |
| 13% Cr | .11 | 12.5 | | 363 | 158–211 |
| 18% Cr | .11 | 17.7 | | 269 | 175–190 |

The first column of Table 1 indicates the nominal percentages of chromium content in chromium steels used as welding rods and the second column indicates the chemical analysis of the resulting weld metals. The third column involves measured values of Vickers hardness of the conventional weld metals having the compositions indicated in the corresponding rows of the second column respectively. Each of these figures was measured at any point on the associated specimen. The fourth column involves measured magnitudes of Vickers hardness of the weld metals of the instant invention including the compositions indicated in the corresponding rows of the second column respectively, together with titanium and niobium in an amount equal to ten times the content of carbon in the weld metal. Each of the specimens cut from weld metals of the present invention had hardness measurements conducted at several points thereon and the maximum and minimum values are indicated in the fourth column.

From Table 1 it is apparent that the weld metals of the instant invention have very low Vickers hardnesses compared with conventional weld metals although the magnitudes thereof vary over a relatively wide range because of the inherent nature of the weld metals.

The reason for the decrease in Vickers hardness, as previously described, is due to the presence of titanium and niobium in the proper amount in the weld metal which effectively prevents the binding of carbon with the chromium and/or iron contained in the weld metal and hence prevents the precipitation of chromium carbide, cementite and/or matensite. This was confirmed by determining the microstructure of the deposit metals under a microscope.

As above described, weld metal obtained according to the invention does not contain harmful precipitate. Therefore, such weld metal has not only low hardness, but also, as will be described hereinafter, has a high degree of toughness and does not develop the cracks which usually occur upon quenching following welding. Therefore, pre- and post-heat treatments can be eliminated from welds obtained by means of the present invention.

The invention also will be described in conjunction with welding of hot-rolled sheets of stainless steels, such as AISI type 405 stainless steel, containing aluminum for the purpose of preventing self-hardening due to a thermal effect. Because of its high resistance to sulfur gases, this type of stainless steel is frequently used in oil refinery equipment as anticorrosive and heatproof material. However, if these sheets are welded by using 13 percent Cr welding rods available in the market, the welded parts are hardened due to their self-hardening property. Therefore, those portions of such sheets to be welded are required to be preheated at a temperature of from 200°to 300° C. and the welded parts must be post heated at a temperature of from 700°to 750° C. in order to soften the same. This results in a great increase in cost.

To avoid the drawback just described, in the past, welding rods of austenitic stainless steel type, for example, of 25 percent chromium /20 percent nickel type or 25 percent-chromium/12 percent nickel type, without the property of self-hardening have been used in welding stainless steel containing aluminum. If such welding rods and aluminum containing stainless steels are used in manufacturing petroleum chemical equipment, various serious problems are encountered. For example, the resulting weld metals are corroded by sulfur compounds in corrosive atmospheres because of difference in the composition of the weld and base metal which has been welded. Corrosion of the weld metal causes a reduction in the intercrystalline corrosion-resisting property of the weld metal. The intercrystalline corrosion-resisting property of the weld metal may be also adversely affected by thermal stresses developed therein due to the difference in the coefficients of thermal expansion of the weld and parent metals from an annealing operation to remove welding stresses, and from a bending operation at elevated temperatures. When such operations are affected at a temperature of about 500°to 800° C., the intercrystalline corrosion-resisting property is much reduced. Further, chlorides can develop stress corrosion cracks in the weld metals. In addition, the welding rods used per se are quite expensive because of their high nickel content.

In contrast, according to the invention, a welding rod of 13 percent-chromium-steel type belonging to the same category as the parent or base material to be welded is employed which results in various advantages. This type of welding rod may include from 11.5 to 14.5 percent of chromium. For example, electrolytic corrosion does not usually develop in the resulting weld metal because the material of welding rod used is of the same type as the base material. The weld metal develops no serious corrosion such as intercrystalline corrosion and corrosion fatigue which frequently occur in austenitic stainless steels due to the action of sulfur compounds or of chlorides. There is no decrease in the anticorrosive property of the weld metals of the instant invention due to the precipitation of carbides on grain boundaries during annealing of the product as usually occurs with austenitic stainless steels. The product weld of the instant invention is free from damages such as corrosion fatigue, thermal stress and the like caused therein from difference in coefficients of thermal expansion. This is because the composition of the welding rod used is of the same type as that of the parent or base material to be welded.

The present consumable welding rods can be applied to welding the following metals:

Welding chromium steel, ordinarily used, which contains about 0.5—30 percent Cr, to a similar Cr steel.

Welding the above mentioned Cr steel to ordinary carbon steels.

Welding the above mentioned Cr steel to various low alloy steels containing Ni, Cr, Mn, Mo, V, etc. above or in combination in an amount of several percent or less.

Thus, the invention provides a non-self-hardened weld metal on a base member by using a welding rod including a composition of same type as the base member and also including titanium and niobium in the specified amount, as illustrated by the examples. It should be noted also, that the deposit metal does not include expensive nickel in large amount.

EXAMPLE 1

Sheets of AISI type 405 stainless steels were welded by using the conventional 13 chromium welding rods similar in composition to the sheets and the welding rods of the invention respectively. The resulting weld metals included the compositions listed in Table 2.

TABLE 2.—COMPOSITION OF WELDING ROD AND WELD METAL

| Composition | Welding rod | | | | | | Weld metal | | | | | |
|---|---|---|---|---|---|---|---|---|---|---|---|---|
| | C | Si | Mn | Cr | Ti | Nb | C | Si | Mn | Cr | Ti | Nb |
| Used welding rod: | | | | | | | | | | | | |
| Present rod | 0.068 | 0.52 | 0.42 | 13.65 | 0.34 | 0.29 | 0.062 | 0.48 | 0.38 | 13.14 | 0.26 | 0.21 |
| Conventional rod | 0.068 | 0.75 | 0.65 | 13.88 | | | 0.063 | 0.72 | 0.60 | 13.47 | | |

TABLE 3.—CRACK RATE FOR WELD METAL IN PERCENT

| Pre-heating | Room temperature | 100° C. | 200° C. | 300° C. |
|---|---|---|---|---|
| Used welding rod: | | | | |
| Present rod | 4.8 | 1.1 | 0 | 0 |
| Conventional rod | 100 | 58.1 | 34.8 | 9.5 |

REMARK.—The crack rates are represented in terms of a relative lenght of crack with respect to a weld length.

TABLE 4.—MECHANICAL PROPERTIES OF WELD METAL

| Used welding rod | Tensile strength in kg./mm.² | | Elongation in percent | | Hardness Hv | | Charpy impact, kg.-m.-cm.² | |
|---|---|---|---|---|---|---|---|---|
| | As welded | Annealed* | As welded | Annealed* | As welded | Annealed* | As welded | Annealed* |
| Present rod | 74.6 | 66.4 | 17.5 | 26.2 | 213 | 176 | 5.4 | 12.9 |
| Conventional rod | 112.8 | 66.7 | 9.4 | 25.0 | 872 | 187 | 1.2 | 12.4 |

*Specimens were annealed at 720° C. for 2 hours and then cooled in air in order to remove stresses from the same.

EXAMPLES 2—5

Chromium steel cores having added thereto molybdenum, titanium and niobium in amounts specified in Table 5 were used in Examples 2—5 to form weld metals to about 15 mm. on AISI type 405 plate through an argon shielded welding operation. Samples cut from each of the weld metals have been found to have the chemical composition and the mechanical properties tabulated in Table 5.

Table 4 indicates the composition of various hot-rolled steel sheets used in terms of the same properties as determined for the deposit metals and listed as specimen nos. 1—9. Specimen 10 in Table 4 is weld metal obtained by a conventional procedure.

From Tables 4 and 5 it will be apparent that, as compared with the conventional rod used, the invention has provided a weld metal having a very low hardness even as it was welded. The figures of the tensile strength and elongation indicate that the weld metal according to the invention had satisfactory toughness even as it was welded. This is clearly shown in Table 3 wherein the results of crack tests are tabulated. As shown in Table 3, the present invention gave extremely excellent results although the test upon which the data in Table 3 were based would have been severe as a test for crack sensitivity. Thus, the weld metal according to the invention does not need to be preheated except for an extremely cold condition.

TABLE 5.—COMPOSITION AND MECHANICAL PROPERTIES OF WELD METAL

| Ex. No. | Type of steel (weld metal) | Chemical composition in percent | | | | | | Mechanical properties at room temperature | | | Creep strength in kg./mm.² (1%/10⁵ hr. creep strain rate) | | | | |
|---|---|---|---|---|---|---|---|---|---|---|---|---|---|---|---|
| | | C | Mn | Si | Cr | Mo | Nb | Ti | Tensile strength in kg./mm.² | Yield point in kg./mm.² | Elongation in percent | 454° C. | 482° C. | 510° C. | 538° C. | 566° C. |
| 2 | 12%Cr-Ti-Nb-0.5Mo | 0.06 | 0.42 | | 12.81 | 0.51 | 0.34 | 0.15 | 54.7 | 31.4 | 8.8 | 8.2 | 6.4 | 4.6 | 3.1 |
| 3 | 9%Cr-Ti-Nb-0.5Mo | 0.08 | 0.37 | | 9.46 | 0.53 | 0.45 | 0.18 | 57.6 | 29.1 | 10.4 | 9.3 | 7.6 | 5.2 | 3.7 |
| 4 | 12%Cr-Ti-Nb-1.5Mo | 0.06 | 0.36 | | 12.52 | 1.54 | 0.35 | 0.16 | 56.4 | 31.6 | 9.0 | 8.4 | 7.5 | 4.8 | 3.5 |
| 5 | 9%Cr-Ti-Nb-1.5Mo | 0.08 | 0.34 | | 9.33 | 1.52 | 0.43 | 0.19 | 59.7 | 28.7 | 10.6 | 9.8 | 8.0 | 5.6 | 3.7 |

REMARK. Stress was removed by annealing at 710° C. for 2 hours followed by cooling in furnace.

From the foregoing, it will be appreciated that the invention is applicable to a variety of chromium steels with excellent results. Among them, the so-called stainless 13 percent chromium steels including about 11.5 to 14.5 percent of chromium, small amounts of carbon, silicon, manganese, phosphur, sulfur, and impurities; and optionally including small amounts of aluminum and other element or elements for the purpose of improving their properties are frequently used as claddings for sheet steels, such as ASTM type A-204 steel etc., for use in high temperature-pressure vessels and low chromium steel alloys, such as ASTM type A-387, type A-357 steels etc. containing 1 to 5 percent of chromium in order to prepare apparatus employed in the field of chemical industries and more particularly of petroleum refinery. Examples of stainless 13 percent chromium steels involve AISI type 403, type 405, type 410, etc.

In welding clad members, it is common practice to weld first the side of a thick base metallic material with any suitable welding rod similar in type to the base material and then to remove the bottom portion of bead, and thereafter to weld the cladding material side.

The invention is applicable to and advantageous with respect to welding of such a clad member. More specifically, as in the previously described simple construction of chromium steels, a cladding chromium steel and composite construction generally of chromium steels is advantageously welded by a weld metal in which titanium and niobium originating from a welding rod and/or a flux is present in the indicated amount with respect to a carbon content of the weld metal, so that the weld metal is substantially free from hardening, selective corrosion etc. In this case, however, it has been found that a serious problem of dilution of ingredients in the weld metal is still present. When a composite construction of chromium steels is welded with a welding rod having a composition similar to the stainless chromium steel of a cladding member, the ingredients, especially chromium originating from the welding rod are diluted by the penetration of a portion of the weld metal present on the previously welded adjacent base portion into the newly formed weld metal.

As an example, it is assumed that a base member is formed of 1 percent chromium/0.5 percent molybdenum steel alloy such as ASTM type A-387, Grade B steel and that a cladding member is formed of 13 percent chromium steel containing aluminum (e.g. AISI type 405 steel). Under these circumstances, if a welding rod of 13 percent chromium steel similar in type to the cladding member is used to effect welding of a first layer of the cladding member, then a chromium content in that portion of a weld metal corresponding to the first layer of the cladding side is diluted by the order of about 9 percent, by the penetration of a portion of the deposit metal already present on the base member. The weld metal thus diluted is listed as specimen no 10 in Table 4.

As seen in Table 4, weld metal, specimen no. 1 has a creep strength as low as 3.9 kg./mm.² at 510° C. The essential components of petroleum refinery apparatus are operated at elevated temperatures such as 510° C. As an example of a suitable base material that might be used for petroleum refinery apparatus is hot rolled steel sheet, specimen no. 7 listed in Table 4 and having a creep strength of 7.7 kg./mm.². Therefore, the weld metal has a very low creep strength as compared with the associated steel sheet.

TABLE 6.—COMPOSITION AND MECHANICAL PROPERTIES OF ROLLED SHEET

| Specimen No. | Type of steel | Chemical composition | | | | | Mechanical properties at room temperature | | | Creep strength in kg./mm.² (1%/10⁵ hr. creep strain rate) | | | | |
|---|---|---|---|---|---|---|---|---|---|---|---|---|---|---|
| | | C | Mn | Si | Cr | Mo | Tensile strength in kg./mm.² | Yield point in kg./mm.² | Elongation in percent | 454° C. | 482° C. | 510° C. | 538° C. | 566° C. |
| 1 | 12% Cr-Al | <.08 | <1.0 ~14.50 | <1.0 | 11.50 ~.30 | Al.10 | >42.2 | >17.6 | >20 | 7.1 | 6.4 | 5.6 | 2.8 | |
| 2 | 12% Cr | <.15 | <1.0 | <1.0 | 11.50 ~13.50 | | >45.7 | >21.1 | >20 | 8.5 | 7.7 | 6.2 | 4.5 | 3.1 |
| 3 | 17% Cr | <.12 | <1.00 | <1.0 | 16.00 ~18.00 | | >45.7 | >21.1 | >22 | 8.1 | 7.6 | 6.5 | 4.6 | 3.1 |
| 4 | 0.5% Mo | <.23 | <.90 ~.30 | .15 | | .45 ~.60 | >45.7 ~54.1 | >26.0 | >25 | 10.1 | 8.8 | 7.0 | 4.4 | |
| 5 | 0.5% Mo ᵃ | <.25 | <.90 ~.30 | .15 | | .45 ~.60 | 49.2 ~59.8 | >28.1 | >23 | 10.5 | 9.0 | 7.0 | 4.4 | |
| 6 | 0.5% Mo ᵃ | <.28 | <.90 ~.30 | .15 | | .45 ~.60 | 52.7 ~63.3 | >30.2 | >22 | 11.2 | 9.1 | 7.0 | 4.4 | |
| 7 | 1% Cr-0.5% Mo | <.17 | .40 ~.65 | .15 ~.30 | .80 ~1.15 | .45 ~.65 | 42.2 ~57.6 | >24.6 | >24 | 10.0 | 9.2 | 7.7 | 5.3 | 3.5 |
| 8 | 2¼% Cr-1% Mo | <.15 | .30 ~.60 | <.50 | 2.00 ~2.50 | .90 ~1.10 | 42.2 ~59.8 | >21.1 | >20 | 10.0 | 9.2 | 5.5 | 4.1 | |
| 9 | 5% Cr-0.5% Mo | <.15 | .30 ~.60 | <.50 | 4.00 ~6.00 | .45 .65 | 42.2 ~56.2 | >21.1 | >20 | 8.7 | 8.1 | 7.0 | 5.1 | 3.7 |
| 10 | 9% Cr ᵇ | .08 | .44 | .50 | 8.64 | | 68.1 | >20.5 | | 7.3 | 5.4 | 3.8 | 1.3 | 0.7 |

ᵃ Denotes figures for the rolled steel sheet 2 4" thick.
ᵇ Represents a weld metal formed by a conventional procedure.

The use of a welding rod of 13 percent chromium steel including titanium and niobium in the indicated amount according to the invention resulted in a weld metal having a higher creep strength than ordinary weld metal; however, when the chromium content of the weld metal is diluted as described above, the creep strength of the weld metal is reduced and therefore the resulting weld metal usually has a creep strength inferior to that of the base metal.

This means that in a device such as a reaction tower in a petroleum refinery equipment, the base material which has to provide the greater part of the mechanical strength during an operation is reduced in strength by a magnitude corresponding to the thickness of the portion of the weld metal which has penetrated into the adjacent portion of its cladding material. In order to ensure that such a device has sufficient strength without increasing the thickness of the base material, it is highly desirable to increase the mechanical strength and especially the high temperature creep strength of the weld metal portion in a first layer on and adjacent to the boundary of the base material.

A substantial improvement of the mechanical properties of the weld metal portion in the first layer results, according to the invention, by including in the weld metal, in addition to the required amount of titanium and niobium a controlled amount of a suitable element metal, in the above case, 0.2 to 3 percent of molybdenum.

In order that the resultant weld metal contain 0.2 to 3.0 percent of molybdenum, the required content of molybdenum in the welding rod and/or the flux calculated as follows, $$(0.2 \sim 3.0) \div \%0.7 = 0.30 \sim 4.3\% \qquad (13)$$

taking into account the penetration of molybdenum into the portion of the weld metal on the base side. It can be reasonably assumed that if the portion of the weld metal on the base material side contains no molybdenum, a maximum of approximately 30 percent of molybdenum will penetrate from the weld metal of the first layer of the cladding side into the base-weld metal. Also, it can be assumed that at most, approximately 20 percent of molybdenum contained in the welding rod and/or the flux will be lost due to oxidation during the welding operation, although the loss of molybdenum may vary considerably depending upon the welding operation involved. Considering the oxidation loss of molybdenum during welding this calculated value is corrected to $$(0.3 \sim 4.3)\% 0.32 = 0.36 \sim 5.5\% \qquad (14)$$

Accordingly, the required amount of molybdenum to be added to a welding rod and/or a flux has been calculated as 0.36~5.5 percent. However, if molybdenum is contained in the portion of the weld metal on the base side, the loss of molybdenum due to its penetration into base-weld metal may be appreciably decreased, and also, the oxidation loss of molybdenum may be reduced during welding operation. This leads to the final content of molybdenum in a welding rod and/or a flux ranging from approximately 0.3 to 5.5 percent.

The following examples illustrate welding of metals having a composite structure.

EXAMPLE 6

A reactor for reforming petroleum products, namely a No. 2 unified reactor equipped on Tokuyama Refinery of Idemitsu Kosan Kabushiki Kaisha as specified below was welded on the cladding side according to the instant invention. The chemical composition of the filler rod, filler metal and the resulting weld metal and the mechanical properties of the filler metal are set forth in Table 7.

Figure 2:
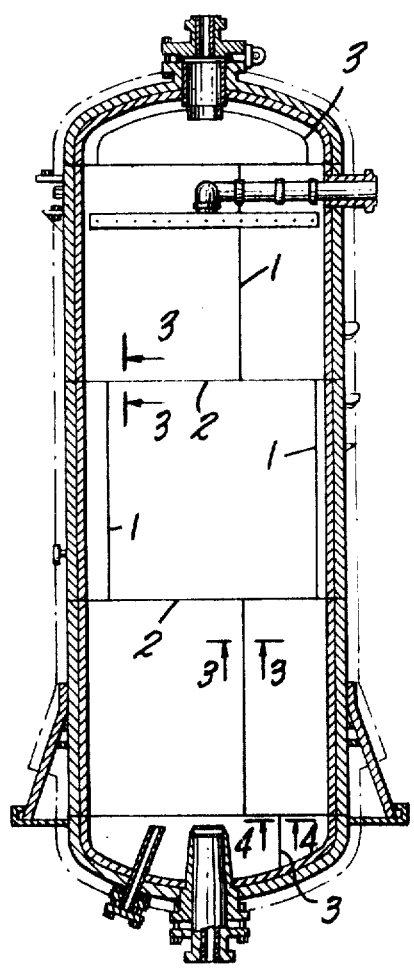

Specification of Reactor which is also illustrated in FIGS. 1 and 2.
  Type: Fixed Catalyst Bed
  Dimensions:
    Overall height: 8.56 m.
    Height of cylindrical pattern: 6.553 m.
    Diameter (outer): 2.464 m.
    Diameter (inner): 2.286 m.
    Thickness of shell: 0.089 m.
  Design Pressure: 65 kg./cm.$^2$G
  Hydraulic Test Pressure: 120 kg./cm.$^2$G
  Pneumatic Test Pressure: 72 kg./cm.$^2$G
  Leakage Test:
    Reinforcing rods: 7 kg./cm.$^2$G
    Linings: 1.5 kg./cm.$^2$G
  Design Temperature 454° C
  Radiographing: Full (JIS Grade 2)
  Stress Relief: Yes Although the invention eliminates the necessity of relieving stress in the resulting products the reactor was legally required to be subject to annealing because of hydrogen used at elevated temperatures under high pressures.

Figure 3:
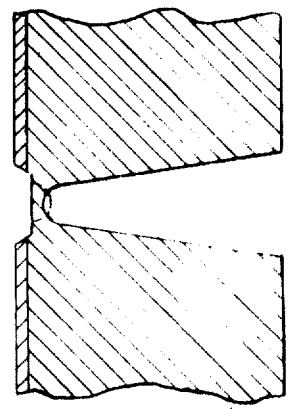
FIGS. 3 and 4 are enlarged schematic views illustrating welds obtained by means of the present invention.
Figure 4:
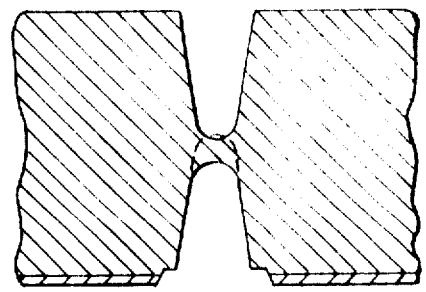

Material:
  Body: Clad steel corresponding to ASTM264:89mm. thick
  Base Metal: ASTM-A204-A-FBQ (low Mo steel) 85.5mm. thick
  Clad Metal: AISI 405 (13 Cr-A1 steel)
  Nozzle and flange: AISI 405 lining
  Internal equipment: AISI 405
Welding:
  Shape and dimension of groove:
    Shell Long and Circular Seams, illustrated in FIG. 3
      Thickness of shell: 0.089 m.
        Shape of groove:
          depth: 0.078 m.
          angle between sidewalls of groove: 15°
          curvature of bottom (radius): 0.008 m.
          symmetrical inclination of sidewalls
        Shape of inside cavity against the bottom of groove:
          depth: 0.005 m.
          width of top aperture: 0.022 m.
          angle between sidewalls of cavity: 60°
    Head Long Seams, illustrated in FIG. 4
      Thickness of Shell: 0.089 m.
        Inside groove:
          depth: 0.0295 m.
          angle between sidewalls of groove: 15°
          curvature of bottom (radius): 0.008 m.
        Outside groove:
          depth: 0.0485 m.
          angle between sidewalls of groove: 15°
          curvature of bottom (radius): 0.008 m.
    Distance between the bottom surface of both grooves: 0.006 m.
    Both grooves have symmetrical inclination of sidewalls
    Inside cavity having the inside groove
      depth: 0.005 m.
      angle between sidewalls of cavity: 60°
      width of intermediate edges: 0.005 m.
      symmetrical inclination of sidewalls
  Welding on base side: Union welding Automatic
    Core rod: Oxweld No. 40A (produced by Kobe-Seiko Kabushiki Kaisha)
    Composition: Union weld grade 80 (produced by Linde Aire Products Co.)
  Welding on cladding side: Arc Welding: Using the present invention. Filler rods used have a diameter of 3.6 mm., and composition, and mechanical strengths listed in Table 7 which also lists a composition of the resulting weld metal.

Example 7 Repairing Pump Impellers of 13 Cr-Steel

The argon gas shield tungsten arc welding was performed with a filler rod having a diameter of 3.6 mm. The chemical composition of the filler rod, filler metal and weld metal and the mechanical strength of the filler metal is set forth in Table 7.

The invention has been described in conjunction with welding of a clad steel sheet in which a 13 percent-chromium steel is used as a cladding material, however, it is equally applicable to welding of any clad steel sheet including cladding and base materials different from those above described.

The following examples further illustrate welding according to the present invention. The welding rods used provided the indicated deposit metals including the nominal composition set forth in the table below.

TABLE 7

| | Composition, percent | | | | | | Mechanical strength of filler metal | | | | | | |
|---|---|---|---|---|---|---|---|---|---|---|---|---|---|
| | C | Si | Mn | Cr | Nb | Ti | T.S., kg./mm.² | Y.P., kg./mm.² | R.A., percent | E., percent | H.B. | Bend, 180° | Remark |
| Example 6: | | | | | | | | | | | | | |
| Filler rod | 0.06 | 0.39 | 0.60 | 13.46 | 0.83 | 1.91 | | | | | | | Coated with the usual fluxes. |
| Filler metal | 0.07 | 0.36 | 0.58 | 13.32 | 0.70 | 0.16 | 86.4 | 61.5 | 34.7 | 25.2 | 174 | Good | |
| Weld metal | 0.08 | 0.36 | 0.55 | 13.19 | 0.63 | 0.14 | | | | | 176 | do | |
| Example 7: | | | | | | | | | | | | | |
| Filler rod | 0.15 | 0.39 | 0.49 | 13.27 | 0.75 | 1.83 | | | | | | | |
| Filler metal | 0.16 | 0.37 | 0.47 | 13.17 | 0.74 | 1.70 | 86.4 | 62.9 | 31.8 | 23.0 | 189 | | |
| Weld metal | 0.024 | 0.36 | 0.46 | 13.08 | 0.70 | 1.41 | | | | | 203 | | |
| Parent metal | 0.32 | 0.32 | 0.47 | 12.84 | | | | | | | 194 | | |

NOTE.—T.S.=Tensile strength; Y.P.=Yield point; E.=Elongation; R.A.=Reduction in area; H.B.=Brinnell hardness.

EXAMPLE 7

In a reaction tower for use in refining petroleum, the first layer of AS Type 405 clad steel was welded using a 17 Cr-Nb-Ti welding rod for manual arc welding. The single layer welding of the clad steel was carried out under the following conditions:

(b) The parameters used:
 diameter of welding rod: 4.0 mm.
 length of welding rod: 350 mm.
 current: 125 a.
 pre-heating: 120° C.

In the following Table 8, is set forth the compositions of weld metal, parent metal, and metal deposited from a rod of the present invention.

TABLE 8

| | | C | Si | Mn | P | S | Cr | Nb | Ti |
|---|---|---|---|---|---|---|---|---|---|
| Deposited metal | Nominal | >0.09 | 0.30–0.75 | 0.4–1.0 | >0.03 | >0.03 | 15–18 | >1.0 | >0.3 |
| Do | Analysed | 0.08 | 0.62 | 0.81 | 0.010 | 0.009 | 16.81 | 0.82 | 0.21 |
| Weld metal | do | 0.09 | 0.54 | 0.74 | 0.011 | 0.010 | 14.13 | 0.74 | 0.16 |
| Parent metal | do | 0.21 | 0.46 | 0.56 | 0.012 | 0.011 | | | |

EXAMPLE 8

A recovery boiler was welded with the same rod and under the same conditions as described in Example 8, to provide padding reinforcement on the furnace tube or bottom to prevent corrosion due to smelting.

EXAMPLE 9

Diesel piston crowns of low-chromium steel were welded with same welding rod and under the same conditions as described in Example 7 to provide padding in order to prevent an explosion loss.

EXAMPLE 10

A 13 percent-chromium steel was welded with a 13 Cr-Nb-Ti welding rod for manual arc welding under the following conditions:

(b) The parameters used.
 diameter of welding rod: 3.2 mm.
 length of welding rod: 350 mm.
 current: 90 a.
 preheating: no In Table 9, the composition of the resultant weld metal is set forth together with the composition of the parent metal and deposited metal.

TABLE 9

| | | C | Si | Mn | P | S | Cr | Nb | Ti |
|---|---|---|---|---|---|---|---|---|---|
| Deposited metal | Nominal | >0.10 | 0.30–0.75 | 0.4–1.0 | >0.03 | >0.03 | 11–14 | >1.0 | >0.3 |
| Do | Analysed | 0.07 | 0.55 | 0.94 | 0.012 | 0.013 | 12.35 | 0.85 | 0.22 |
| Weld metal | do | 0.09 | 0.54 | 0.86 | 0.013 | 0.012 | 12.42 | 0.73 | 0.15 |
| Parent metal | do | 0.14 | 0.52 | 0.63 | 0.014 | 0.011 | 12.65 | | |

While the invention has been described in conjunction with certain preferred examples thereof, it is to be understood that various changes and modifications may be resorted to without departing from the spirit and scope of the invention. For example, the type of cladding and base materials composing clad steels and more particularly of weld metals dependent upon the base materials are not restricted to those indicated in the examples as previously described. If desired it may be varied, for example, in accordance with the required strength of the resulting welded joint. Also, a welding rod and/or a flux may be varied in composition, if desired. Further, upon welding the cladding side of a clad steel, a welding rod such as above described may be used to weld its first layer while any other suitable rod or rods may be used to weld the second and subsequent layers of the cladding side.

Further, if respective materials for a stainless chromium steel sheet and a base metal plate to be lined therewith are similar in combination to the clad steels previously described, then the welding method, according to the invention is advantageously applicable to the lining of the plate with the sheet by direct welding technique. It is also applicable to welding stainless chromium steel pipes with low-chromium-molybdenum steel pipes. In this case, the invention gives results similar to those obtained with the clad steel previously described.

What we claim and desire to secure by Letters Patent is:

1. A consumable welding rod of the chromium steel type for use in welding members of chromium steels other than nickel-chromium steels of austenitic structure including titanium and niobium in such proportion that a weld metal formed by metal formed by melting said rod on said member contains said titanium and niobium in an amount which corresponds to the expression 2Ti+Nb=6C to 14C wherein Ti, Nb and C are the proportion of titanium, niobium and carbon respectively in said weld metal, the proportion of said titanium and niobium in said welding rod to obtain said proportion in said weld metal being determined by estimating the total quantity of carbon in said weld metal, the quantities of carbon, titanium and niobium lost by oxidation during welding, and the variation in the quantities of carbon, titanium and niobium in said weld metal resulting from welding process conditions including welding current, flux use, and welding atmosphere and in said welding rod said niobium and titanium being in such proportion that twice the content of titanium plus the content of niobium ranges from about 0.26 percent to 5.0 percent by weight of said rod.

2. A consumable welding rod according to claim 1 in which the proportion of said niobium and said titanium in said rod determined by means of the equation $C=[W\ C_1 \times C_2(1-x)]$, wherein $W$ is the weight of weld metal, $C_1$ is the average percent content of carbon in the fused portion of said member, $C_2$ is the average percent content of carbon in the weld metal, and $x$ is the proportion of the weld metal originating from said member, and by estimating the quantities of carbon and said titanium and said niobium lost by oxidation during welding, and the variations in the quantities of said titanium and said niobium and carbon in said weld metal resulting from welding process conditions including welding current, flux used, and welding atmosphere.

3. A consumable welding rod according to claim 1 in which said rod also contains 0.3 to 5.5 percent by weight of molybdenum.

4. A consumable welding rod as defined in claim 1 wherein said rod has the configuration of coiled wire suitable for automatic continuous welding and said niobium and titanium are included as a powder in the interior of said wire.

5. A consumable welding rod of chromium steel type for use in welding members of chromium steels other than nickel-chromium steels of austenitic structure which comprises by weight of said rod, 0.07 percent to 1.3 percent titanium, 0.15 percent to 5.0 percent niobium, and 0.3 percent to 5.5 percent molybdenum.

6. A consumable welding rod as defined in claim 5 wherein said rod has the configuration of coiled wire suitable for automatic continuous welding and said niobium, titanium and molybdenum are included as a powder in the interior of said wire.

7. A consumable welding rod of the chromium steel type for use in welding members of chromium steels other than nickel-chromium steels of austenitic structure and a flux, including titanium and niobium in such proportion that a weld metal formed by melting said rod and flux on said member contains carbon, titanium and niobium in an amount which corresponds to the expression 2Ti+Nb=6C to 14C wherein Ti, Nb and C are the proportion of titanium, niobium and carbon respectively in said weld metal, the proportion of titanium and niobium in said rod and flux to obtain said proportion in said weld metal being determined by estimating the total quantity of carbon in said weld metal, the quantities of carbon and titanium and niobium lost by oxidation during welding, and the variations in the quantities of titanium, niobium and carbon in said weld metal resulting from welding process conditions including welding current and welding atmosphere, (said titanium comprising 0.07 percent to 1.3 percent by weight of said rod, and said niobium comprising 0.15 percent to 5.0 percent by weight of said rod) the total amount of titanium and niobium in said rod and said flux being about 0.26 percent to 5.0 percent by weight based on the weight of said rod.

8. A consumable welding rod and a flux according to claim 7 in which said part of the required amount of niobium and titanium is included in said rod and part of the required amount of niobium and titanium is included in said flux.

9. A consumable welding rod and flux according to claim 7 in which the required amount of niobium and at least part of the required amount of titanium are present in said rod.

10. A consumable welding rod and flux according to claim 7 in which the least part of the required amount of niobium or part of the required amount of titanium is present in said flux.

11. A consumable welding rod and flux according to claim 7, including 0.3 percent to 5.5 percent molybdenum by weight of said rod.

12. A consumable welding rod of the chromium steel type for use in welding members of chromium steels other than nickel-chromium steels of austenitic structure including niobium and titanium in such proportion that twice the content of titanium plus the content of niobium ranges from about 0.26 percent to 5.0 percent by weight.

13. A method of preparing a consumable welding rod for welding chromium steels other than nickel-chromium steel of austenitic structure which comprises estimating the amount of carbon in the resultant weld metal formed by melting said rod on said chromium steel by determining the amount of carbon in said steel to be welded and the amount of carbon in said welding rod and estimating the proportion of said steel and said rod in the resultant weld metal, estimating the quantities of carbon, titanium and niobium to be lost by oxidation during welding, estimating the variations in the quantities of titanium, niobium and carbon in the resultant weld metal due to welding process conditions including welding current, welding atmosphere and the use of a flux and then forming a welding rod including titanium and niobium in such amount that said resultant weld metal contains titanium and niobium in an amount which corresponds to the expression 2Ti+Nb=6C to 14C wherein Ti, Nb and C are the proportions of titanium, niobium and carbon respectively in said weld metal.

14. A method of preparing a consumable welding rod according to claim 13 in which said welding rod is formed by including additionally 0.3 to 5.5 percent by weight of molybdenum.